US010502126B2

(12) United States Patent
Villemin et al.

(10) Patent No.: US 10,502,126 B2
(45) Date of Patent: Dec. 10, 2019

(54) ADJUSTABLE-TRIM CENTRIFUGAL COMPRESSOR FOR A TURBOCHARGER

(71) Applicant: Honeywell International Inc., Morris Plains, NJ (US)

(72) Inventors: Pascal Villemin, Girancourt (FR); Hani Mohtar, Chaumousey (FR); Stephane Pees, Ceintrey (FR); Alain Lombard, Chavelot (FR); Stephane Doise, Epinal (FR)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 15/456,403

(22) Filed: Mar. 10, 2017

(65) Prior Publication Data

US 2018/0258842 A1    Sep. 13, 2018

(51) Int. Cl.
| | |
|---|---|
| *F02B 37/22* | (2006.01) |
| *F01D 17/14* | (2006.01) |
| *F02C 6/12* | (2006.01) |
| *F16K 3/03* | (2006.01) |
| *F04D 29/46* | (2006.01) |

(52) U.S. Cl.
CPC .......... *F02B 37/225* (2013.01); *F01D 17/146* (2013.01); *F02C 6/12* (2013.01); *F04D 29/464* (2013.01); *F16K 3/03* (2013.01); *F05D 2220/40* (2013.01); *F05D 2250/51* (2013.01); *F05D 2270/101* (2013.01); *Y02T 10/144* (2013.01)

(58) Field of Classification Search
CPC ...... F02B 37/22; F01D 17/141; F01D 17/143; F01D 17/146; F01D 17/16

USPC ............................................................ 60/600
See application file for complete search history.

(56) References Cited

U.S. PATENT DOCUMENTS

| | | | |
|---|---|---|---|
| 2015/0041695 A1* | 2/2015 | Daniels .................... | F16K 3/03 251/212 |
| 2015/0354591 A1 | 12/2015 | Ibaraki et al. | |
| 2016/0177956 A1* | 6/2016 | Mohtar ................ | F01D 17/146 417/406 |

(Continued)

FOREIGN PATENT DOCUMENTS

| | | | | |
|---|---|---|---|---|
| CA | 2960516 A1 * | 3/2016 | ............ | F04C 29/124 |
| DE | 2114702 A1 | 10/1972 | | |
| DE | 102006011862 A1 * | 9/2007 | ............ | F02B 37/225 |

(Continued)

OTHER PUBLICATIONS

EPO Search and Opinion in EP Appl. No. 18160826.6-1007, dated Jul. 26, 2018.

*Primary Examiner* — Ngoc T Nguyen
(74) *Attorney, Agent, or Firm* — John C. James (57) ABSTRACT

A centrifugal compressor for a turbocharger includes an inlet-adjustment mechanism in an air inlet for the compressor, operable to move between an open position and a closed position in the air inlet. The inlet-adjustment mechanism includes a plurality of vanes formed as ring segments and disposed about the air inlet and each movable circumferentially and radially inwardly through a slot in the air inlet wall so as to form an orifice of reduced diameter relative to a nominal diameter of the inlet. Movement of the inlet-adjustment mechanism from the open position to the closed position is effective to shift the compressor's surge line to lower flow rates.

3 Claims, 9 Drawing Sheets

(56) References Cited

U.S. PATENT DOCUMENTS

2017/0089357 A1\* 3/2017 Colont .................. F04D 29/464

FOREIGN PATENT DOCUMENTS

| DE | 102012011423 | B3 | | 11/2013 | |
|----|----|----|----|----|----|
| DE | 102013003418 | A1 | * | 8/2014 | ........... F04D 29/464 |
| DE | 102010026176 | B4 | | 12/2015 | |
| EP | 3023644 | A1 | | 5/2016 | |
| EP | 3236077 | A1 | | 10/2017 | |
| EP | 3051099 | B1 | * | 11/2017 | ............. F01D 17/14 |
| FR | 2997432 | A1 | * | 5/2014 | ............. E03F 5/107 |
| GB | 957884 | A | | 5/1964 | |
| JP | 3719337 | B2 | | 9/2005 | |
| JP | 2007127121 | A | * | 5/2007 | ........... F01D 17/165 |
| JP | WO 2016052372 | A1 | * | 4/2016 | ............... F02D 9/02 |
| WO | WO 9728390 | A1 | * | 8/1997 | ............... F16K 3/03 |
| WO | 2013074503 | A1 | | 5/2013 | |

\* cited by examiner

ADJUSTABLE-TRIM CENTRIFUGAL COMPRESSOR FOR A TURBOCHARGER

BACKGROUND OF THE INVENTION

The present disclosure relates to centrifugal compressors, such as used in turbochargers, and more particularly relates to centrifugal compressors in which the effective inlet area or diameter can be adjusted for different operating conditions.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

Turbochargers typically employ a compressor wheel of the centrifugal (also known as "radial") type because centrifugal compressors can achieve relatively high pressure ratios in a compact arrangement. Intake air for the compressor is received in a generally axial direction at an inducer portion of the centrifugal compressor wheel and is discharged in a generally radial direction at an exducer portion of the wheel. The compressed air from the wheel is delivered to a volute, and from the volute the air is supplied to the intake of an internal combustion engine.

The operating range of the compressor is an important aspect of the overall performance of the turbocharger. The operating range is generally delimited by a surge line and a choke line on an operating map for the compressor. The compressor map is typically presented as pressure ratio (discharge pressure Pout divided by inlet pressure Pin) on the vertical axis, versus corrected mass flow rate on the horizontal axis. The choke line on the compressor map is located at high flow rates and represents the locus of maximum mass-flow-rate points over a range of pressure ratios; that is, for a given point on the choke line, it is not possible to increase the flow rate while maintaining the same pressure ratio because a choked-flow condition occurs in the compressor.

The surge line is located at low flow rates and represents the locus of minimum mass-flow-rate points without surge, over a range of pressure ratios; that is, for a given point on the surge line, reducing the flow rate without changing the pressure ratio, or increasing the pressure ratio without changing the flow rate, would lead to surge occurring. Surge is a flow instability that typically occurs when the compressor blade incidence angles become so large that substantial flow separation arises on the compressor blades. Pressure fluctuation and flow reversal can happen during surge.

In a turbocharger for an internal combustion engine, compressor surge may occur when the engine is operating at high load or torque and low engine speed, or when the engine is operating at a low speed and there is a high level of exhaust gas recirculation (EGR). Surge can also arise when an engine is suddenly decelerated from a high-speed condition. Expanding the surge-free operation range of a compressor to lower flow rates is a goal often sought in compressor design.

BRIEF SUMMARY OF THE DISCLOSURE

The present disclosure describes mechanisms and methods for a centrifugal compressor that can enable the surge line for the compressor to selectively be shifted to the left (i.e., surge is delayed to a lower flow rate at a given pressure ratio). One embodiment described herein comprises a turbocharger having the following features:

a turbine housing and a turbine wheel mounted in the turbine housing and connected to a rotatable shaft for rotation therewith, the turbine housing receiving exhaust gas and supplying the exhaust gas to the turbine wheel;

a centrifugal compressor assembly comprising a compressor housing and a compressor wheel mounted in the compressor housing and connected to the rotatable shaft for rotation therewith, the compressor wheel having vanes and defining an inducer portion, the compressor housing having an air inlet wall defining an air inlet for leading air generally axially into the compressor wheel, the compressor housing further defining a volute for receiving compressed air discharged generally radially outwardly from the compressor wheel; and a compressor inlet-adjustment mechanism disposed in the air inlet of the compressor housing and movable between an open position and a closed position, the inlet-adjustment mechanism comprising a plurality of vanes disposed about the air inlet, each vane comprising a segment of a full 360° ring, the vanes each being movable with a combined rotational motion about a rotational axis of the compressor simultaneous with a radial motion with respect to said rotational axis, the vanes moving to the closed position through a slot in the air inlet wall so as to form an orifice of reduced diameter relative to a nominal diameter of the inlet.

In accordance with one embodiment, each vane includes a radially inner edge having a circular-arc shape, the vanes being configured so that said radially inner edges collectively form the orifice as substantially circular in the closed position of the inlet-adjustment mechanism.

In one embodiment, the inlet-adjustment mechanism comprises a stand-alone cartridge including first and second annular end plates that are stationary and are axially spaced apart, and the vanes are disposed between said end plates. The cartridge is disposed in an annular space defined by the compressor housing. The annular space can be defined between a main portion of the compressor housing and a separate inlet duct member that forms the majority of the air inlet to the compressor. The duct member is received into a receptacle defined in the main portion of the compressor housing.

In accordance with an alternative embodiment, the inlet-adjustment mechanism is a non-cartridge form wherein the function of the first end plate is performed by an integral portion of the compressor housing, and the function of the second end plate is performed by an integral portion of the inlet duct member.

In accordance with one embodiment the inlet-adjustment mechanism further comprises a unison ring that is rotatable about the rotational axis of the compressor. Each of the vanes includes a pair of circumferentially spaced first pins projecting from a first face of the vane toward the unison ring. The unison ring includes a plurality of pairs of first guide slots, one pair of said first guide slots for each vane, and the first pins of each vane are engaged in a corresponding pair of said first guide slots in the unison ring. Each of the first guide slots follows a path that proceeds radially outward along a first circumferential direction. Each vane further includes a pair of circumferentially spaced second pins projecting from a second face of the vane. A stationary member, which can be the second end plate or alternatively the inlet duct member in the case of a non-cartridge form of the mechanism, includes a plurality of pairs of second guide slots, one pair of said second guide slots for each vane, and the second pins of each vane are engaged in a corresponding pair of said second guide slots. Each of the second guide slots follows a path that proceeds radially inward along said first circumferential direction. The first and second guide slots cross one another at intersection points that lie on a circle whose radius from the rotational axis of the compressor varies with rotational position of the unison ring. Thus, rotation of the unison ring in the first circumferential direction causes each vane to move along the second guide slots and therefore move radially inwardly as the vane moves in said first circumferential direction. Conversely, rotation of the unison ring in an opposite second circumferential direction causes each vane to move along the second guide slots and therefore move radially outwardly as the vane moves in said second circumferential direction.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
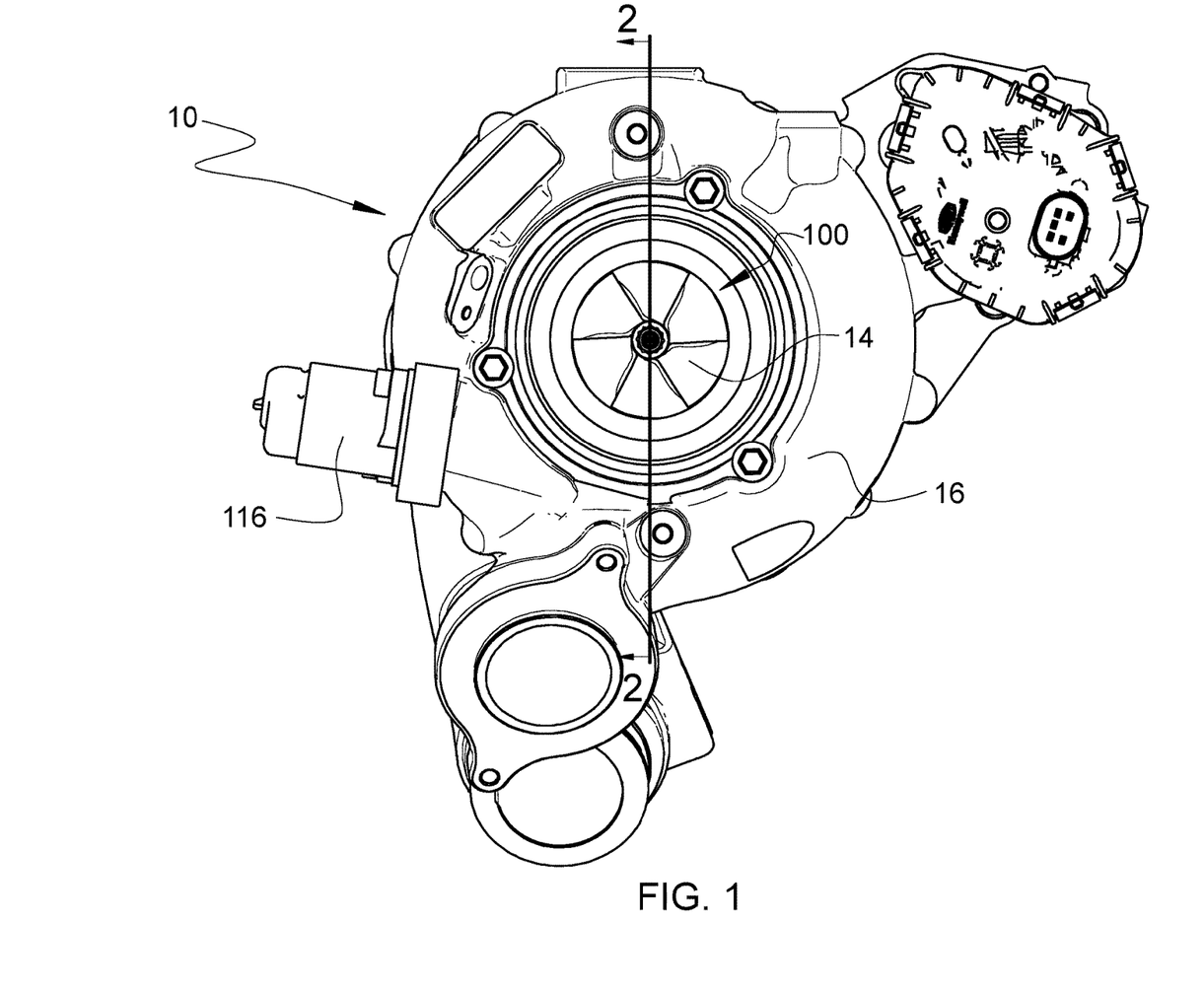
FIG. 1 is an end view of a turbocharger in accordance with one embodiment of the invention, looking axially from the compressor end toward the turbine end of the turbocharger, wherein the inlet-adjustment mechanism is in an open position.
Figure 2:
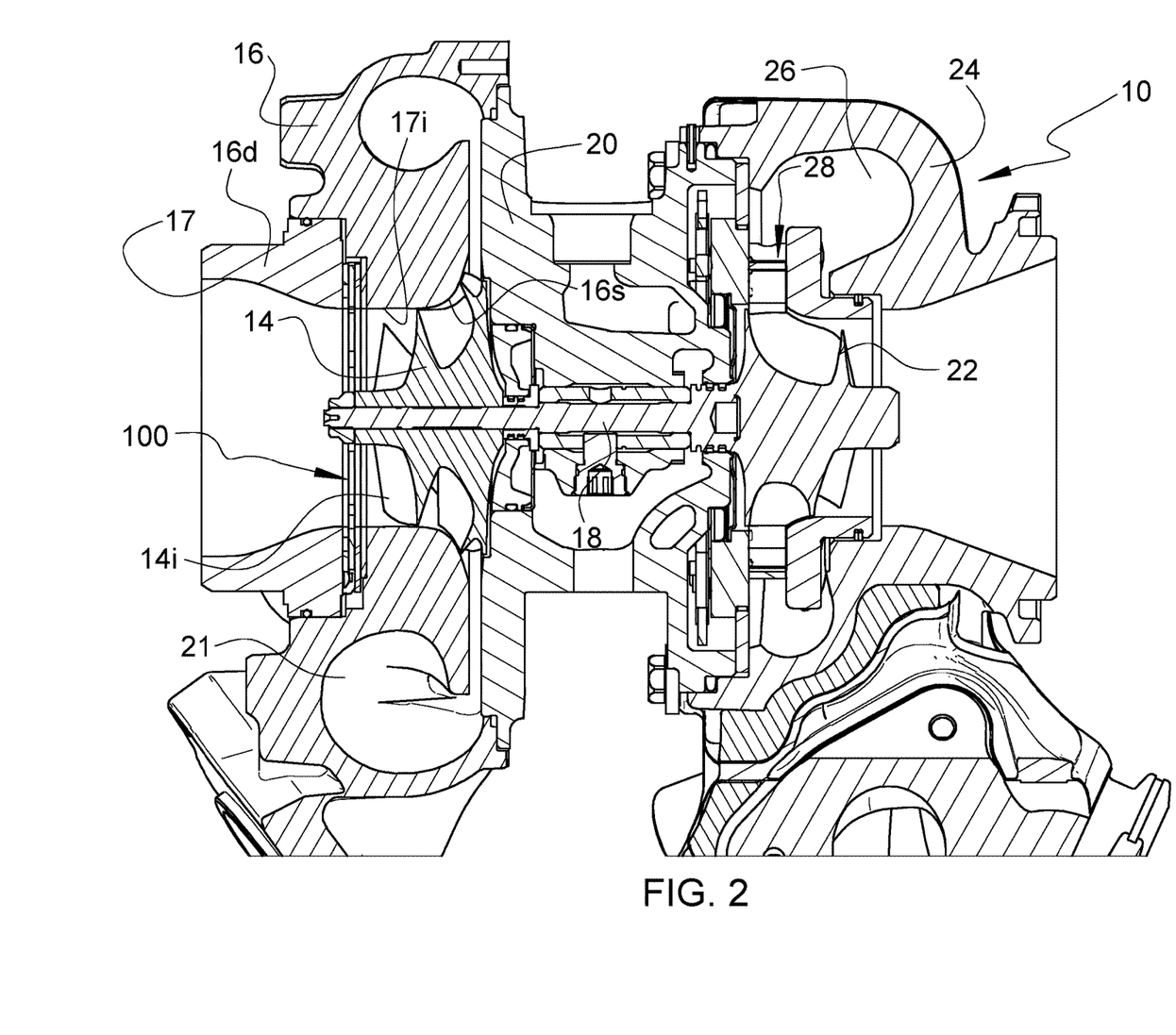
FIG. 2 is a cross-sectional view of the turbocharger along line 2-2 in FIG. 1.

A turbocharger 10 in accordance with one embodiment of the invention is illustrated in axial end view in FIG. 1, and an axial cross-sectional view of the turbocharger is shown in FIG. 2. The turbocharger includes a compressor and a turbine. The compressor comprises a compressor wheel or impeller 14 mounted in a compressor housing 16 on one end of a rotatable shaft 18. The compressor housing includes a wall that defines an air inlet 17 for leading air generally axially into the compressor wheel 14. The shaft is supported in bearings mounted in a center housing 20 of the turbocharger. The shaft is rotated by a turbine wheel 22 mounted on the other end of the shaft from the compressor wheel, thereby rotatably driving the compressor wheel, which compresses air drawn in through the compressor inlet and discharges the compressed air generally radially outwardly from the compressor wheel into a volute 21 for receiving the compressed air. From the volute 21, the air is routed to the intake of an internal combustion engine (not shown) for boosting the performance of the engine.

The turbine wheel 22 is disposed within a turbine housing 24 that defines an annular chamber 26 for receiving exhaust gases from an internal combustion engine (not shown). The turbine housing also defines a nozzle 28 for directing exhaust gases from the chamber 26 generally radially inwardly to the turbine wheel 22. The exhaust gases are expanded as they pass through the turbine wheel, and rotatably drive the turbine wheel, which in turn rotatably drives the compressor wheel 14 as already noted.

With reference to FIGS. 1-2, in the illustrated embodiment, the wall that defines the air inlet 17 is formed in part by the compressor housing 16 and in part by a separate inlet duct member 16d that is received into a cylindrical receptacle defined by the compressor housing. The portion of the air inlet 17 proximate the compressor wheel 14 defines a generally cylindrical inner surface 17i that has a diameter generally matched to the diameter of an inducer portion 14i of the compressor wheel.

The compressor housing 16 defines a shroud surface 16s that is closely adjacent to the radially outer tips of the compressor blades. The shroud surface defines a curved contour that is generally parallel to the contour of the compressor wheel.

In accordance with the invention, the compressor of the turbocharger includes an inlet-adjustment mechanism 100 disposed in the air inlet 17 of the compressor housing. The inlet-adjustment mechanism in the illustrated embodiment comprises a ring-shaped assembly or cartridge that is disposed in an annular space defined between the compressor housing 16 and the separate inlet duct member 16d. The inlet-adjustment mechanism is operable for adjusting an effective diameter of the air inlet into the compressor wheel. As such, the inlet-adjustment mechanism is movable between an open position and a closed position, and can be configured to be adjusted to various points intermediate said positions.

With reference now to FIGS. 4, 5, 5A, and 5B, the inlet-adjustment mechanism comprises a plurality of vanes 102 arranged about the central axis of the air inlet and each movable with a combined rotational and radial motion for regulating a diameter of the orifice defined by the mechanism. Each vane 102 comprises a segment of a full 360° annular ring, and collectively the vanes form said ring. In the illustrated embodiment, the inlet-adjustment mechanism is a cartridge that comprises a first end plate 105, a unison ring 106, and a second end plate 107. The vanes 102 are disposed axially between the unison ring 106 adjacent a first face of the vanes, and the second end plate 107 adjacent an opposite second face of the vanes. The first end plate 105 is disposed on the opposite side of the unison ring from the vanes. Each of the vanes includes a pair of circumferentially spaced first pins P1 (see FIG. 5B) projecting from the first face of the vane toward the unison ring. The unison ring includes a plurality of pairs of first guide slots 106g, one pair of said first guide slots for each vane. The first pins P1 of each vane are engaged in a corresponding pair of said first guide slots 106g in the unison ring. Each of the first guide slots 106g follows a path that proceeds radially outward along a first circumferential direction (i.e., clockwise in FIG. 5).

Each vane 102 further includes a pair of circumferentially spaced second pins P2 projecting from a second face of the vane (FIG. 4), and the inlet-adjustment mechanism comprises a stationary member adjacent the second face of the vanes and defining a plurality of pairs of second guide slots 107g therein. In the illustrated cartridge embodiment of the invention, the stationary member is the second end plate 107, but alternatively in a non-cartridge form the stationary member can be the inlet duct member 16d and the second guide slots can be defined in the inlet duct member. There is one pair of said second guide slots 107g for each vane, and the second pins P2 of each vane are engaged in a corresponding pair of said second guide slots 107g. Each of the second guide slots 107g follows a path that proceeds radially inward along said first circumferential direction (clockwise in FIG. 5). The first and second guide slots 106g, 107g cross one another at intersection points that lie on a circle whose radius from the rotational axis of the compressor varies with rotational position of the unison ring 106. Advantageously, the respective lengthwise directions of each pair of crossing first and second guide slots are approximately perpendicular to each other.

Figure 4:
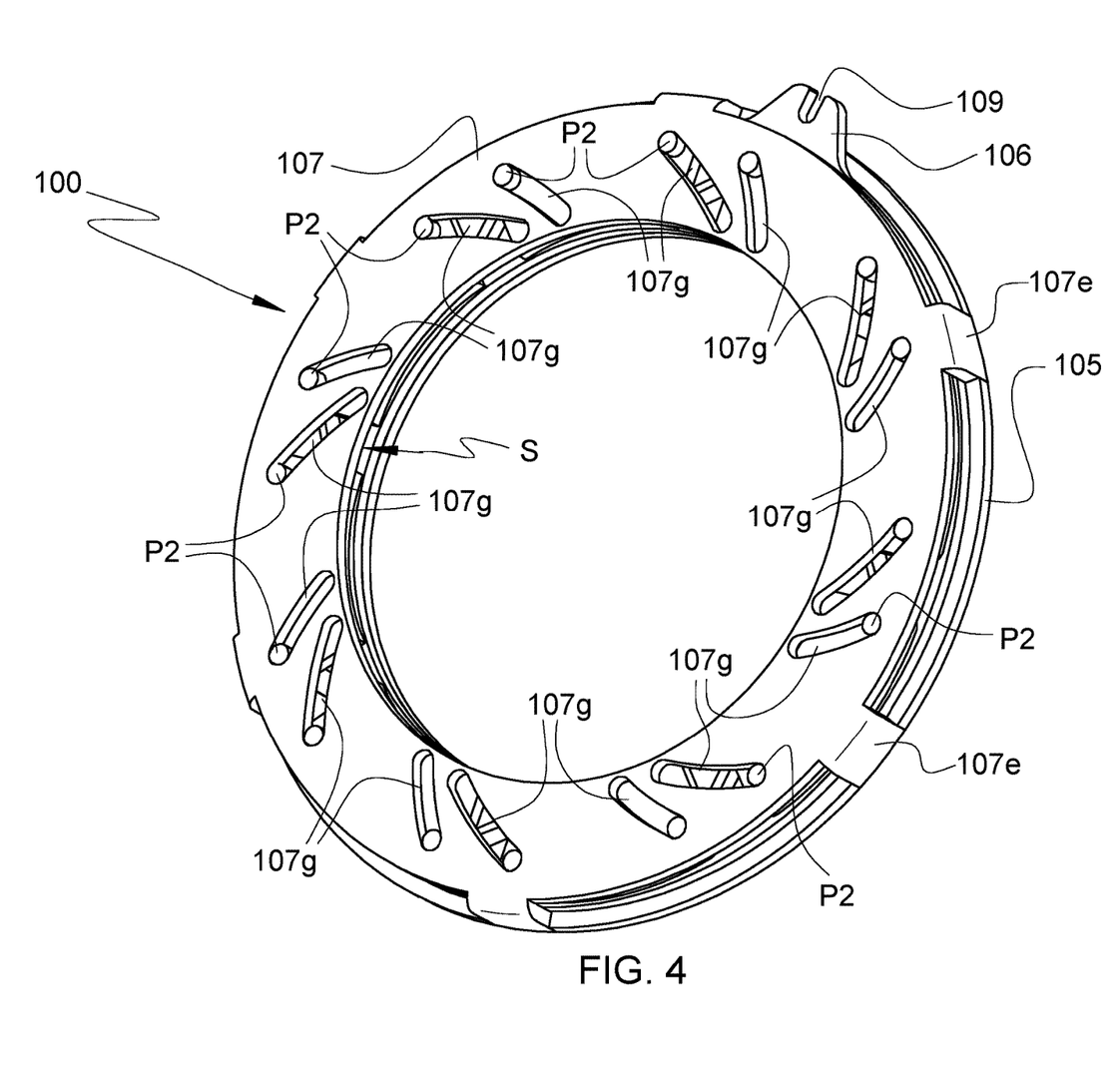
FIG. 4 is a perspective view of an inlet-adjustment mechanism in accordance with an embodiment of the invention, viewed generally from a front side toward a rear side of the mechanism, showing the mechanism in an open position.
Figure 5:
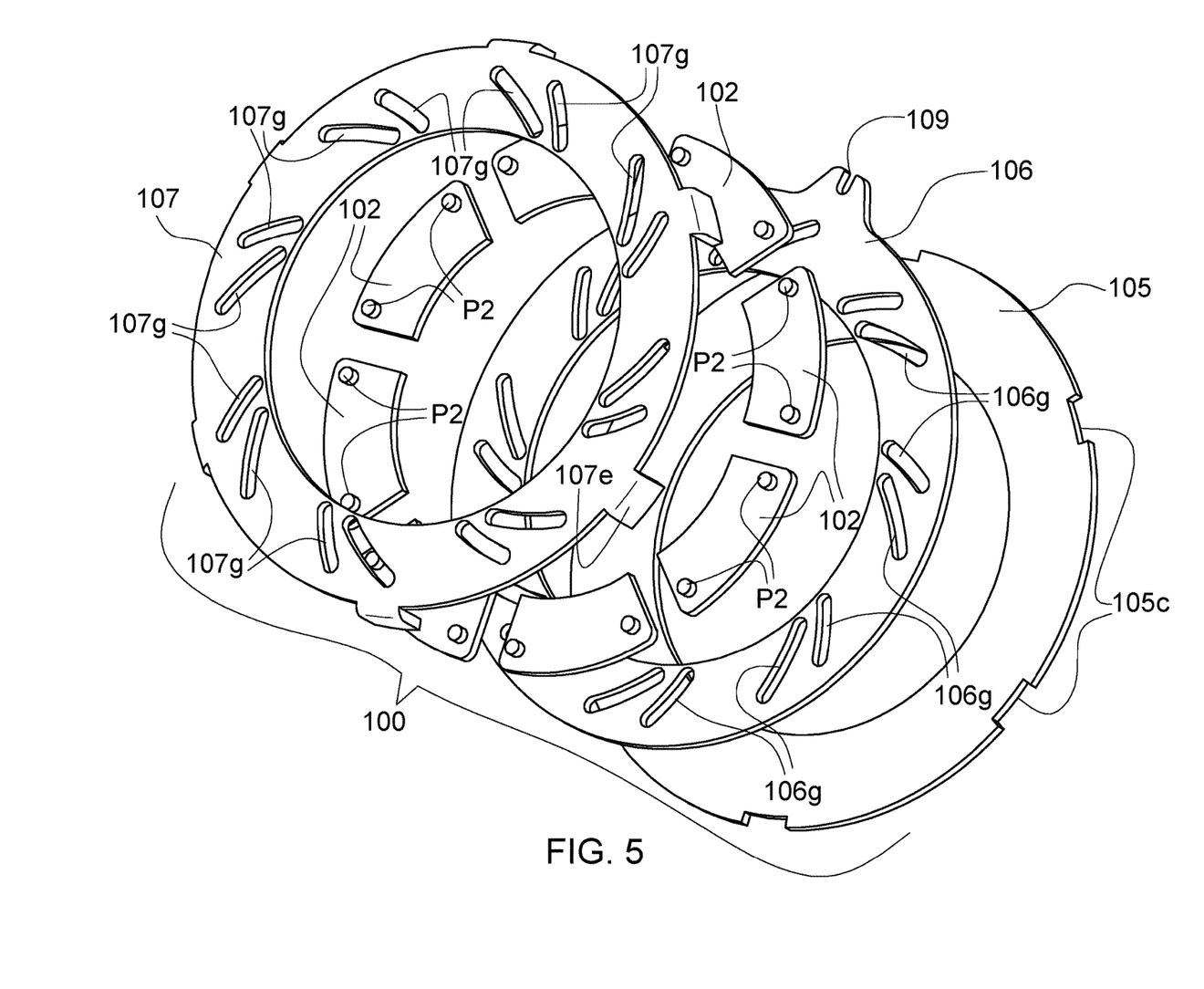
FIG. 5 is an exploded view of the inlet-adjustment mechanism of FIG. 4.
Figures 5A, 5B:
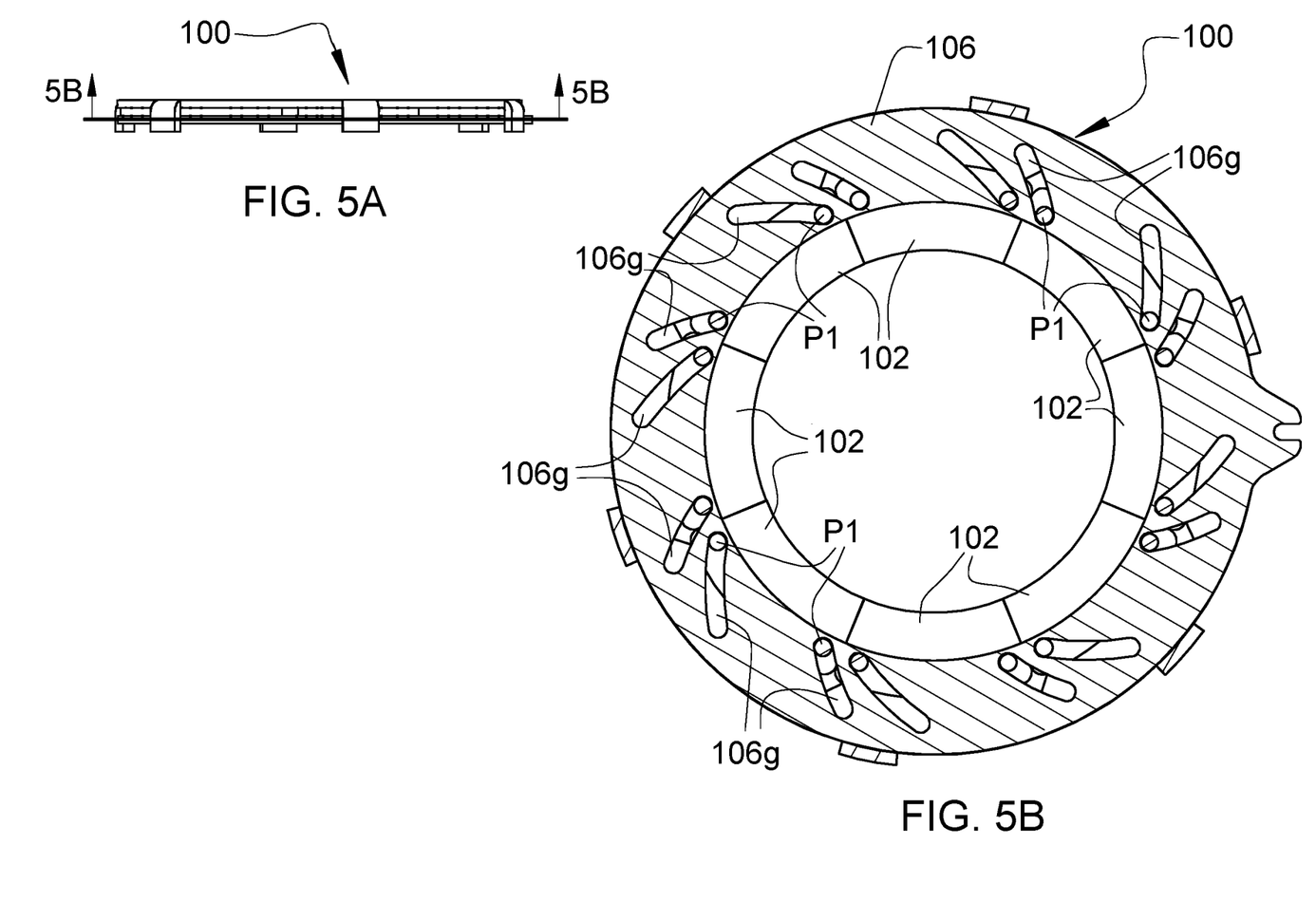
FIG. 5A is a side elevation of the inlet-adjustment mechanism of FIG. 4.
FIG. 5B is a cross-sectional view along line 5B-5B in FIG. 5A.
Figure 6:
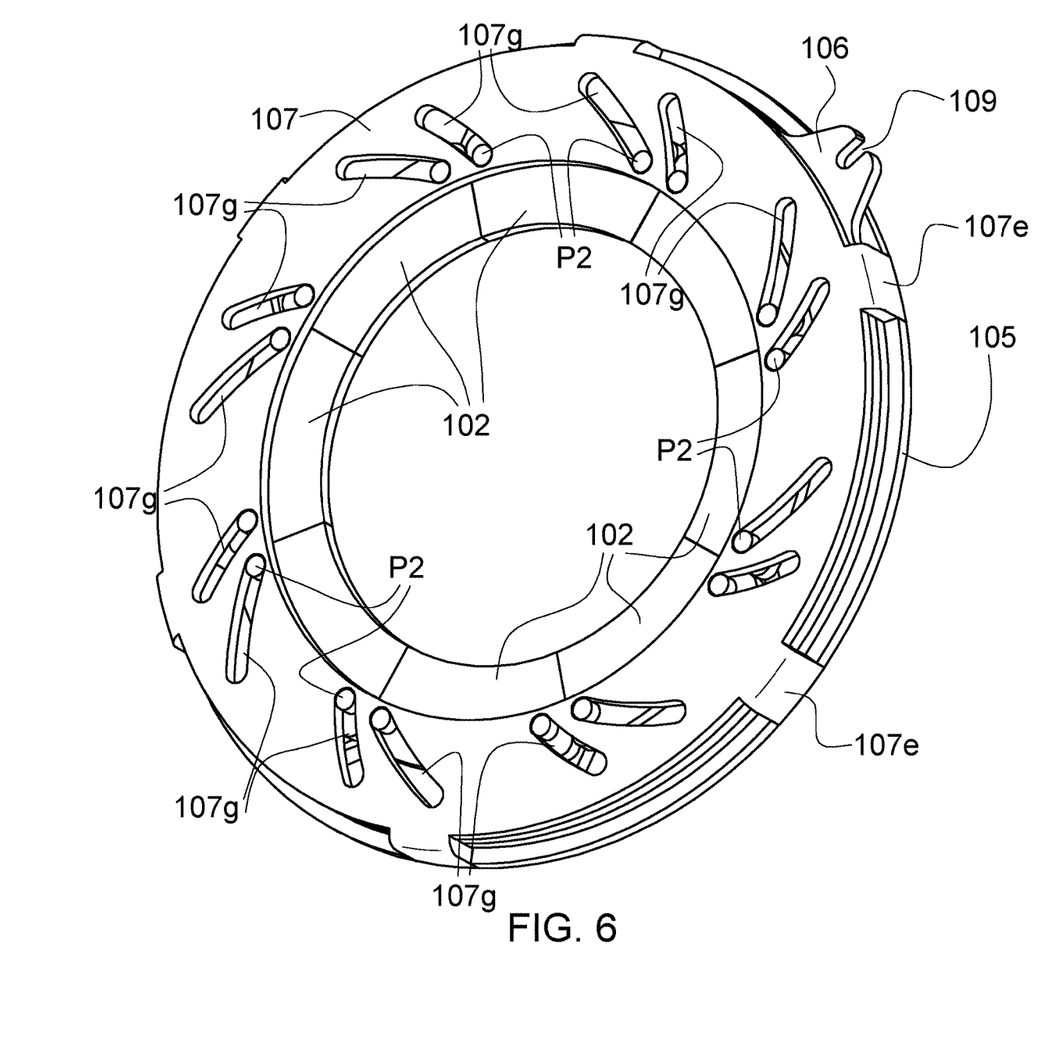
FIG. 6 is a view similar to FIG. 4, showing the inlet-adjustment mechanism in a closed position.
Figure 7:
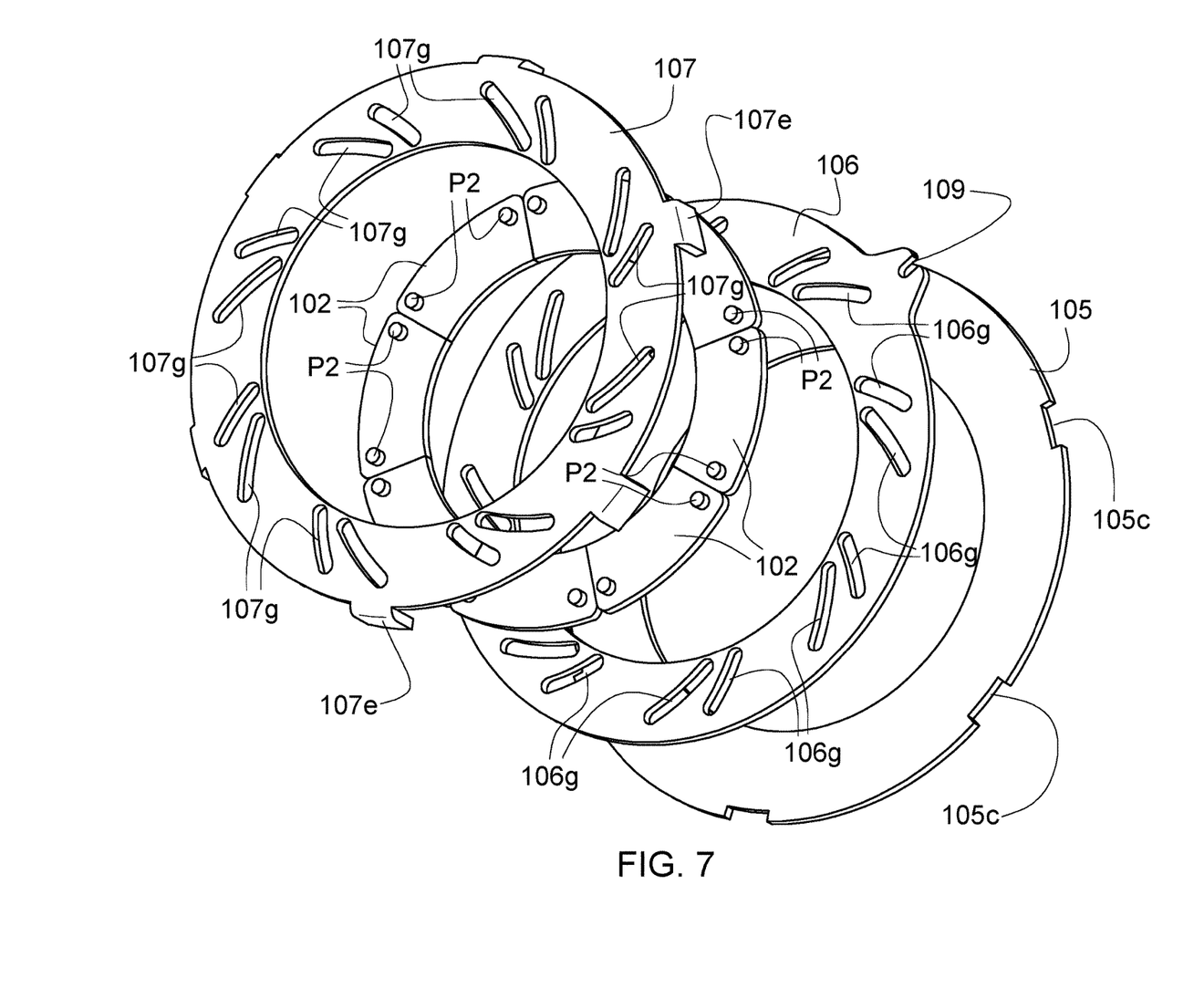
FIG. 7 is an exploded view of the inlet-adjustment mechanism of FIG. 6.

Therefore, rotation of the unison ring 106 in the first circumferential direction (clockwise in FIG. 5) causes each vane to move along the second guide slots 107g and therefore move radially inwardly as the vane moves in said first circumferential direction. Rotation of the unison ring in an opposite second circumferential direction causes each vane to move along the second guide slots 107g and therefore move radially outwardly as the vane moves in said second circumferential direction (compare FIGS. 4 and 5 showing the open position, with FIGS. 6 and 7 showing the closed position). The end plates 105, 107 are prevented from rotating with respect to each other by a plurality of axially projecting ears 107e from the second end plate 107 that are engaged in a corresponding plurality of cutouts 105c in the radially outer periphery of the first end plate 105.

In the illustrated embodiment, the guide slots 106g and 107g are shown as being substantially straight. Alternatively, however, the guide slots can have other shapes such as curved. Curved guide slots in some cases may be advantageous in terms of the kinematics and trajectories of the vanes 102.

As shown in FIG. 2, the entire assembly of the inlet-adjustment mechanism 100 is disposed in an annular space defined between the compressor housing 16 and the inlet duct member 16d. In the cartridge embodiment of the invention as illustrated, the two end plates 105 and 107 have an inner diameter matched to the diameter of the cylindrical inlet surface 17i proximate the inducer 14i of the compressor wheel, such that the two end plates are effectively part of the wall defining the air inlet 17, and such that the axial space between the two end plates effectively forms an opening or slot S (FIG. 4) through the wall of the air inlet. The vanes 102 are arranged to pass through this slot. The radially inner edges of the vanes 102 include portions that preferably are generally circular arc-shaped and these edges collectively surround and bound a generally circular opening. The range of movement of the vanes is sufficient that the vanes can be moved radially outwardly by rotation of the unison ring in one direction to an open position as shown in FIG. 4, in which the vanes are entirely radially outward of the inner peripheries of the end plates 105, 107. As such, in the open position of the vanes, the inlet-adjustment mechanism does not alter the nominal inlet diameter as defined by the inner peripheries of the plates and by the inlet surface 17i.

As noted, in an alternative embodiment (not shown), the inlet-adjustment mechanism is embodied in a non-cartridge form in which there are no separate end plates 105, 107. Thus, the function of the first end plate 105 can be served by an integral portion of the compressor housing 16, and the function of the second end plate 107 can be served by an integral portion of the inlet duct member 16d.

The vanes can also be moved radially inwardly by rotation of the unison ring in the opposite direction to a closed position as shown in FIG. 6. In the closed position, the circular-arc edges along the radially inner sides of the vanes collectively form an orifice that is a circle having a diameter that is less than that of the inlet surface 17i. This has the consequence that the effective diameter of the inlet is reduced relative to the nominal inlet diameter. In this manner, the inlet-adjustment mechanism is able to regulate the effective diameter of the air inlet approaching the compressor wheel.

Figure 3:
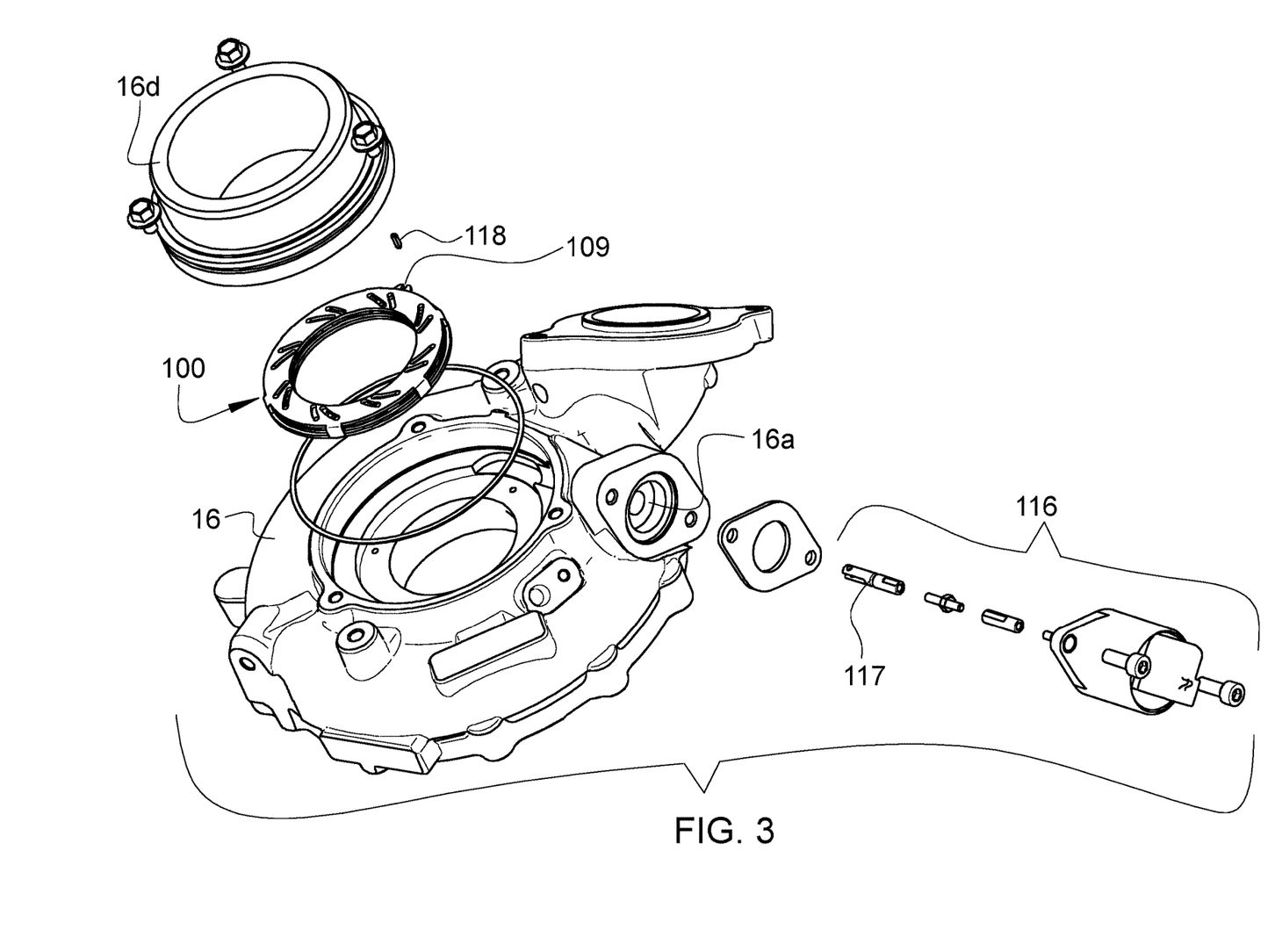
FIG. 3 is a partially exploded view of a compressor portion of the turbocharger of FIG. 2.

As previously described, the vanes 102 are actuated to move between their open and closed positions by the unison ring 106 that is rotatable about the center axis of the air inlet. Referring now to FIG. 3, rotational motion is imparted to the unison ring by an actuator 116 that is received into a receptacle 116a defined in the compressor housing. The actuator includes an actuator rod 117 that extends through a space defined in the compressor housing and is affixed at its distal end to a pin 118 that engages a slot 109 (better seen in FIG. 4) in the outer periphery of the unison ring 106. The actuator is operable to extend and retract the rod 117 linearly along its length direction so as to rotate the unison ring 106 and thereby actuate the vanes 102. Extending the rod pivots the vanes towards the position open (FIG. 4) and retracting the rod pivots the vanes toward the closed position (FIG. 6).

As noted, the inlet-adjustment mechanism 100 enables adjustment of the effective size or diameter of the inlet into the compressor wheel 14. As illustrated in FIG. 6, when the inlet-adjustment mechanism is in the closed position, the effective diameter of the inlet into the compressor wheel is dictated by the inside diameter defined by the vanes 102. In order for this effect to be achieved, the axial spacing distance between the vanes and the compressor wheel must be as small as practicable, so that there is insufficient distance downstream of the vanes for the flow to expand to the full diameter of the inducer portion 14i of the compressor wheel 14 by the time the air encounters it. The inlet diameter is thereby effectively reduced to a value that is dictated by the vanes.

Figure 8:
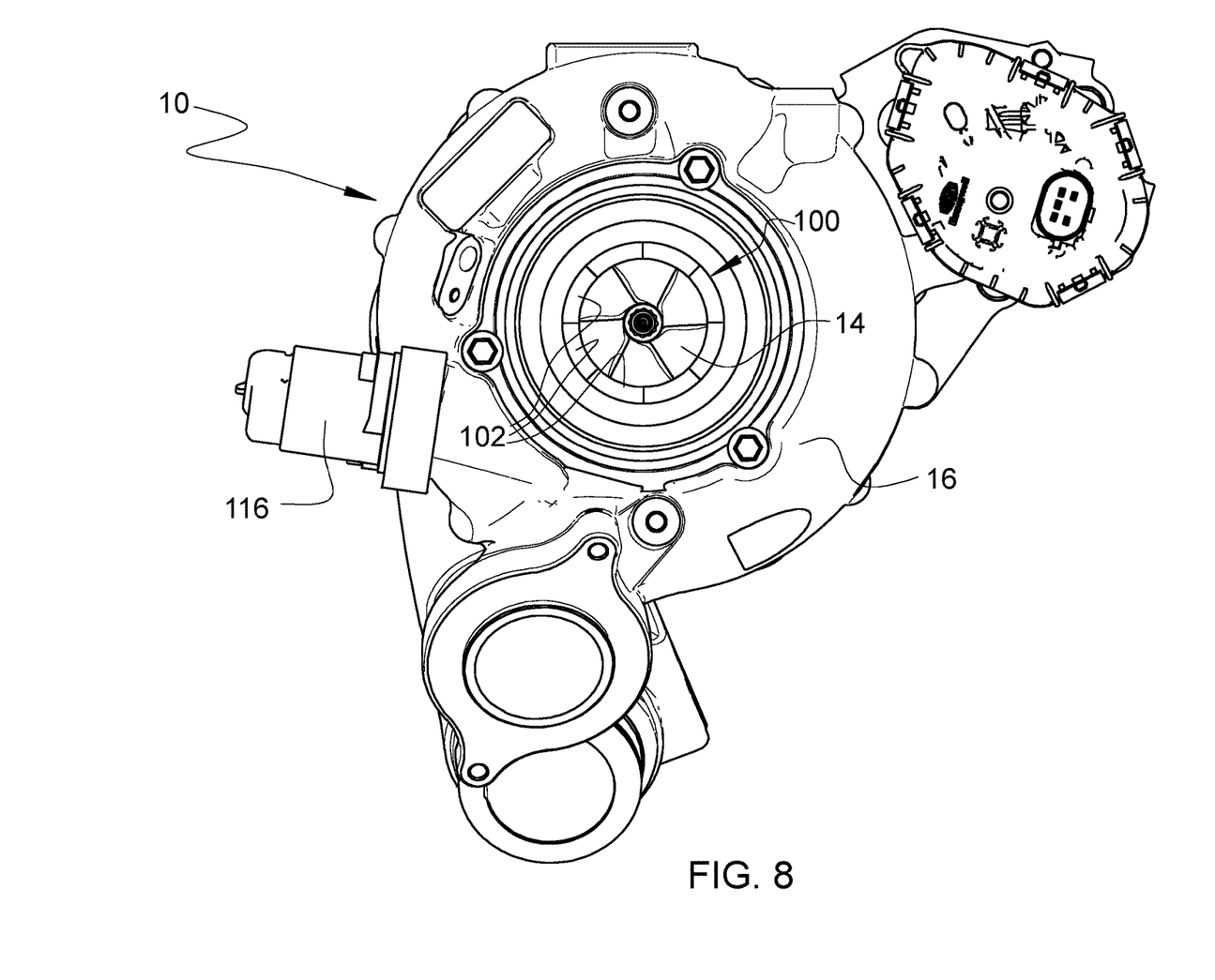
FIG. 8 is an end view of the turbocharger as in FIG. 1, but with the inlet-adjustment mechanism in the closed position.

At low flow rates (e.g., low engine speeds), the inlet-adjustment mechanism 100 can be placed in the closed position of FIGS. 6-8. This can have the effect of reducing the effective inlet diameter and thus of increasing the flow velocity into the compressor wheel. The result will be a reduction in compressor blade incidence angles, effectively stabilizing the flow (i.e., making vane stall and compressor surge less likely). In other words, the surge line of the compressor will be moved to lower flow rates (to the left on a map of compressor pressure ratio versus flow rate).

At intermediate and high flow rates, the inlet-adjustment mechanism 100 can be partially opened or fully opened as in FIGS. 4-5. This can have the effect of increasing the effective inlet diameter so that the compressor regains its high-flow performance and choke flow essentially as if the inlet-adjustment mechanism were not present and as if the compressor had a conventional inlet matched to the wheel diameter at the inducer portion of the wheel.

Many modifications and other embodiments of the inventions set forth herein will come to mind to one skilled in the art to which these inventions pertain having the benefit of the teachings presented in the foregoing descriptions and the associated drawings. For example, although the illustrated embodiment employs eight vanes 102, the invention is not limited to any particular number of vanes. Moreover, as previously noted, while straight guide slots 106g, 107g are illustrated in the drawings, the guide slots do not have to be straight; as another example, the slots can be curved. The illustrated embodiment includes vanes that do not overlap with one another, but alternatively the vanes can overlap. The vanes can be of various shapes, such as sickle-shaped. Additionally, in the illustrated embodiment, the inlet-adjustment mechanism 100 is formed as a stand-alone cartridge, but alternatively, as noted, a non-cartridge embodiment of the invention is also within the scope of the invention. Furthermore, in the illustrated embodiment the unison ring 106 having the moving guide slots 106g and the end plate 107 having the fixed guide slots 107g are on opposite sides of the vanes 102. Alternatively, however, the order of these parts can be altered such that the end plate 107 is disposed between the unison ring 106 and the vanes 102, in which case there can be a single pair of pins projecting from one face of each of the vanes, which pins pass through the fixed guide slots and into the moving guide slots of the unison ring. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger, comprising:
a turbine housing and a turbine wheel mounted in the turbine housing and connected to a rotatable shaft for rotation therewith, the turbine housing receiving exhaust gas and supplying the exhaust gas to the turbine wheel;
a centrifugal compressor assembly comprising a compressor housing and a compressor wheel mounted in the compressor housing and connected to the rotatable shaft for rotation therewith, the compressor wheel having vanes and defining an inducer portion, the compressor housing having an air inlet wall defining an air inlet for leading air generally axially into the compressor wheel, the compressor housing further defining a volute for receiving compressed air discharged generally radially outwardly from the compressor wheel; and
a compressor inlet-adjustment mechanism disposed in the air inlet of the compressor housing and movable between an open position and a closed position, the inlet-adjustment mechanism comprising a plurality of vanes disposed about the air inlet and a unison ring that is rotatable about a rotational axis of the turbocharger, each vane comprising a segment of a full 360° ring, each of the vanes including a pair of circumferentially spaced first pins projecting from a first face of the vane toward the unison ring, the unison ring including a plurality of pairs of first guide slots, one pair of said first guide slots for each vane, wherein the first pins of each vane are engaged in a corresponding pair of said first guide slots in the unison ring, wherein each of the first guide slots follows a path that proceeds radially outward along a first circumferential direction;
wherein each vane further includes a pair of circumferentially spaced second pins projecting from a second face of the vane, the inlet-adjustment mechanism further comprising a stationary member adjacent the second face of the vanes and defining a plurality of pairs of second guide slots therein, one pair of said second guide slots for each vane, wherein the second pins of each vane are engaged in a corresponding pair of said second guide slots, wherein each of the second guide slots follows a path that proceeds radially inward along said first circumferential direction, and wherein the first and second guide slots cross one another at intersection points that lie on a circle whose radius from the rotational axis of the compressor varies with rotational position of the unison ring;
rotation of the unison ring in the first circumferential direction causing each vane to move along the second guide slots and therefore move radially inwardly as the vane moves in said first circumferential direction, and rotation of the unison ring in an opposite second circumferential direction causing each vane to move along the second guide slots and therefore move radially outwardly as the vane moves in said second circumferential direction.

2. The turbocharger of claim 1, wherein each vane includes a radially inner edge having a circular-arc shape, the vanes being configured so that said radially inner edges collectively form the orifice as substantially circular in the closed position of the inlet-adjustment mechanism.

3. The turbocharger of claim 1, wherein the inlet-adjustment mechanism further comprises a cartridge including first and second annular end plates that are stationary and are axially spaced apart, and the vanes are disposed between said end plates, wherein the cartridge is disposed in an annular space defined by the compressor housing, and wherein the stationary member having the second guide slots comprises the second end plate.

* * * * *